Patented July 14, 1942

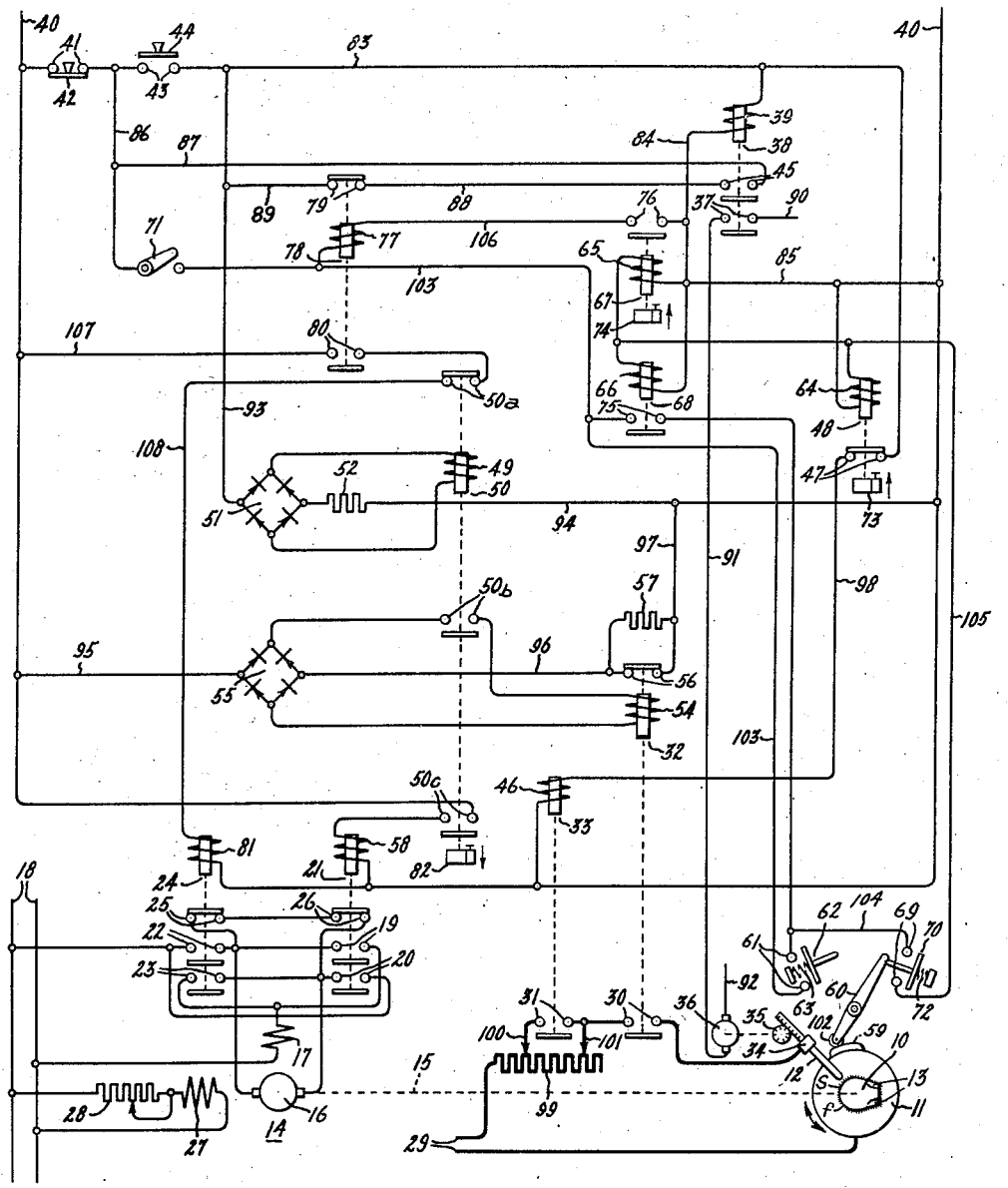

2,289,979

UNITED STATES PATENT OFFICE 2,289,979

AUTOMATIC ARC WELDING SYSTEM

Vernon E. Mann, Scotia, N. Y., assignor to General Electric Company, a corporation of New York Application August 9, 1940, Serial No. 351,979

9 Claims. (Cl. 219—8)

My invention relates to control systems generally, and more particularly to an automatic arc welding control.

It is an object of my invention to provide a system in which the mechanical limitations of limit switch control are corrected by means of time element relays associated therewith.

It is also an object of my invention to provide an automatic arc welding system in which the travel motor is controlled so as to position the welding electrode and work relative to one another to start a weld at a predetermined point on the work and after the welding operation has been completed to return the work to its starting position.

It is a further object of my invention to provide an arc welding system in which a weld is started at a predetermined point on the work and lapped upon itself a predetermined adjustable amount at reduced current.

Further objects of my invention will become apparent from the embodiment thereof diagrammatically illustrated in the accompanying drawing.

When arc welding certain assemblies, it has been found desirable to initiate the welding operation at a predetermined point thereon. It has also been found desirable when completing a weld by lapping it upon itself a predetermined amount to make the overlap with reduced current flow in order to eliminate porosity in the weld. For example, when welding the shell-shaped halves of a float valve chamber, both of these requirements are present. It has been found desirable to initiate the welding operation at a point diametrically opposite the spot welds made on one side of the chamber to complete an initial assembly thereof and to lap the weld upon itself with reduced current flow. In accordance with my invention, a limit switch control for accomplishing these results has been illustrated as forming part of an arc welding system in which provision is also made for striking and maintaining an arc and controlling the flow of welding current to the arc.

As shown in the drawing, the work, a float valve chamber 10, is mounted on a turntable 11 with the flanged portions of its two halves located opposite an arc welding electrode 12. This float valve chamber is positioned on the turntable 11 by reason of the configuration of its supporting surface and that of the turntable so that electrode 12 is located on the other side of the float valve chamber 10 from the spot welds 13 which hold its two halves in assembled position prior to the arc welding operation. Turntable 11 may be guided in its rotation by a cam having a configuration corresponding to that of the outline of the two halves of the float valve chamber 10 at their flanged portions which are to be arc welded together. The construction employed may be that illustrated and described in Patent No. 2,280,627 to Verni J. Chapman, for Arc welding apparatus, issued April 21, 1942 and assigned to the same assignee as this invention.

Turntable 11 is rotated in opposite directions by means of a travel motor 14 mechanically connected thereto by a shaft 15. Forward rotation of the turntable is obtained when the armature 16 of the travel motor is connected in circuit with its series field winding 17 across a source of supply 18 through contacts 19 and 20 of a relay 21. Reverse rotation of the turntable is obtained when its armature and series field are connected across the same source of supply through contacts 22 and 23 of a relay 24. A dynamic braking connection for travel motor 14 is also provided through contacts 25 and 26 of relays 24 and 21. The travel motor is also provided with a separately excited field 27 which is connected across the source of supply 18 through an adjustable resistance 28.

Arc welding current and voltage are supplied to the work 10 and electrode 12 from a source of supply 29. Full current is obtained by the closure of contacts 30 and 31 of electromagnetic switches 32 and 33. The opening of contacts 31 of electromagnetic switch 33 reduces the flow of welding current when the weld is lapped upon itself and the opening of contacts 30 of electromagnetic switch 32 interrupts the flow of welding current.

Electrode 12 may be of the stick type and supported in a holder 34 which, along with the electrode is fed toward and away from the work 10 to strike and maintain a welding arc through the agency of a suitable electrode feeding mechanism 35. This feeding mechanism may be operated by an electric motor 36 forming part of a suitable electrode feed control such as illustrated in United States Letters Patent 1,701,372—Frank M. Jefts, February 5, 1929, or 2,175,017—William D. Cockrell, October 3, 1939.

The energization of electrode feed motor 36 is controlled by the contacts 37 of a relay 38. This relay has an operating winding 39 which is connected across a source of alternating current supply 40 through the normally closed contacts 41 of a stop switch 42 and the normally open contacts 43 of a start switch 44. This relay is also provided with contacts 45 which, when closed, complete a circuit across the contacts 43 of start switch 44.

The closure of start switch 44 also connects the operating winding 49 of a relay 50 across the source of supply 40 through a rectifier bridge 51 having in circuit therewith a resistance 52. When thus energized, relay 50 opens its contacts 50a and closes its contacts 50b and 50c. The closure of contacts 50b connects the operating winding 54 of electromagnetic switch 32 across the source of supply 40 through a rectifier bridge 55. This circuit is initially completed through the contacts 56 of electromagnetic switch 32. Upon operation of electromagnetic switch 32 and the consequent opening of its contacts 56, rectifier bridge 55 is connected across the source of supply 40 through a resistance 57. The closure of contacts 50c of relay 50 connects the operating winding 58 of relay 21 across the source of supply 40. This initiates forward rotation of travel motor 14 and turntable 11 driven thereby.

Upon a predetermined forward rotation of the turntable 11, a cam 59 mounted thereon engages one end of a pivoted lever 60 whose other end is swung into engagement with a limit switch 62 closing its contacts 61 which are normally biased to an open position by a spring 63. The closure of this limit switch simultaneously connects the operating windings 64, 65 and 66 of relays 48, 67 and 68 across the source of supply 40 through the normally closed contacts 69 of a limit switch 70, switch 71 which is normally closed and the contacts 41 of stop switch 42. Contacts 69 of limit switch 70 are normally biased to a closed position by a spring 72. Relays 48 and 67 are time element relays having an adjustable operating period determined in the arrangements illustrated by adjustments of their dashpots 73 and 74.

The closure of contacts 75 of relay 68 completes a maintaining circuit about contacts 61 of limit switch 62 which, after once closing, may again open without affecting the energization of relays 48, 67 and 68. Contacts 47 of relay 48 control the energization of the operating winding 46 of electromagnetic switch 33 and the closure of contacts 76 of relay 61 connects the operating winding 77 of relay 78 across the source of supply 40 through the normally closed contacts 41 of stop switch 42.

The operation of relay 78 opens its contacts 79 which interrupt the circuit in shunt to contacts 43 of start switch 44 and the closing of contacts 80 of relay 78 complete a circuit for the operating winding 81 of relay 24 across the source of supply 40 through contacts 50a of relay 50. The operation of relay 24 imparts reverse rotation to travel motor 14 and turntable 11 resulting in the eventual operation of limit switch 70 through the agency of cam 59 and pivoted lever 60 engaged thereby.

The length, position, and travel of cam 59 relative to lever 60 is such that on reverse rotation cam 59 does not travel beyond lever 60 and thus produce on forward rotation a false operation of limit switch 62 and such that on forward rotation limit switch 62 is operated prior to the arrival of the work and electrode at the positions where the weld closes upon itself and where the weld is ended after a predetermined overlap. The reduction of welding current when the weld closes on itself and the final interruption of the welding operation are determined by adjustments of time element relays 48 and 67. These adjustments eliminate the use of a carefully dimensioned cam or cams and make it possible to position cam 59 on turntable 11 for a desired operation of limit switch 70 without influencing adversely the reduction of welding current at the beginning of weld overlap and the subsequent ending of the welding operation. Relay 68 associated with limit switch 62 permits the travel of cam 59 past lever 60 and the consequent reopening of limit switch 62 without influencing the control of time element relays 48 and 67.

Relay 50 may be provided with a time delay characteristic, by use for example of a dashpot 82, in order to obtain the burn-back control described and claimed in the above referred to Letters Patent of Frank M. Jefts.

The system illustrated in the drawing will be more fully understood from a description of its operation.

In the drawing, the various relays, electromagnetic switches, turntable, work, electrode, and limit switch control are illustrated in the positions they assume at the end of a welding cycle which corresponds to the beginning of the next welding cycle. Switch 71 is closed, however, for rendering the limit switch control effective.

When the operator closes start switch 44, relays 38 and 50 and electromagnetic switch 33 are operated by the connection of their operating windings across the source of supply 40.

The operating winding 46 of electromagnetic switch 33 is connected across the source of supply 40 as follows: From one terminal of the source of supply through contacts 41 of stop switch 42, contacts 43 of start switch 44, conductor 83, contacts 47 of relay 48, and conductor 98 to the other terminal of the source of supply 40. When thus energized, electromagnetic switch 33 closes its contacts 31, shunting out a portion of the controlling resistance 99 which is in the welding circuit. The welding circuit is thus rendered capable of supplying the desired initial value of arc welding current. When these contacts are again opened, a portion of resistance 99 is again inserted in the welding circuit to reduce the value of welding current to that required when completing the welding operation by lapping the weld upon itself. These contacts are connected to adjustable taps or sliders 100 and 101 which engage the resistance 99 and by their positions determine the flow of current in the welding circuit.

The operating winding 39 of relay 38 is connected from one terminal of the source of supply 40 through contacts 41 of stop switch 42, contacts 43 of start switch 44, and conductors 83, 84 and 85 to the other terminal of the source of supply 40. When thus energized, relay 38 closes its contacts 37 and 45. The closure of contacts 45 completes a circuit in shunt to the contacts 43 of start switch 44 through conductors 85, 87, 88, contacts 79 of relay 78 and conductors 89 and 93. This establishes a maintaining circuit not only for the operating winding of relay 38 but also for the operating windings of relay 50 and electromagnetic switch 33. The operator, consequently, can start the welding operation by momentarily depressing the start switch 44. The closure of contacts 37 of relay 38 control the energization of electrode feed motor 36 by completing its armature circuit through conductors 90, 91 and 92.

The closure of start switch 44 connects the operating winding 49 of relay 50 across the source of supply 40 as follows: From one terminal of the source of supply through contacts 41 of stop switch 42, contacts 43 of start switch 44, conductor 93, rectifier bridge 51, resistor 52, and conductor 94 to the other terminal of the source of supply. When thus energized, this relay opens its contacts 50a and closes its contacts 50b and 50c. The closure of its contacts 50b connects the operating winding 54 of electromagnetic switch 32 across the source of supply 40 as follows: From one terminal of the source of supply through conductor 95, rectifier bridge 55, conductor 96, contacts 56 of electromagnetic switch 32, and conductors 97 and 94 to the other terminal of the source of supply. Electromagnetic switch 32 is thus operated to close its contacts 30 and open its contacts 56. The opening of its contacts 56 inserts a protective resistance 57 in circuit with the rectifier bridge 55 and the closure of its contacts 30 completes the welding circuit.

The closure of contacts 50c of relay 50 connects the operating winding 58 of relay 21 across the source of supply 40. This relay consequently closes its contacts 19 and 20 and opens its contacts 26. The opening of contacts 26 removes the dynamic braking connection established by these contacts in conjunction with contacts 25 of relay 24 and the closure of contacts 19 and 20 connects the travel motor 14 across the source of supply 18 for forward rotation which is imparted through shaft 15 to turntable 11 on which the work 10 is supported.

The operation of the start button 44 thus initiates the welding operation by applying full welding current and voltage to the work 10 and electrode 12, completes the operating circuit of the feed motor 36, and initiates travel in a forward direction by starting clockwise rotation of turntable 11. As previously pointed out, once the start switch is depressed, a holding circuit is completed in shunt to its contacts so that the several operations continue thereafter until the desired cycle of operations has been completed under the control of limit switches 62 and 70.

Turntable 11 will rotate in a forward or clockwise direction a predetermined amount before a welding arc is established between the work 10 and electrode 12 by the electrode feeding mechanism including feed motor 36. The point at which a weld is initiated may, for example, be at the point marked s on the work. As turntable 11 rotates in its forward or clockwise direction, cam 59 attached thereto is rotated relative to pivoted lever 60 and eventually this cam releases this lever, permitting limit switch 70 to close its contacts 69 under the influence of its spring 72 which normally biases these contacts into engagement with one another. In order to facilitate travel of the surface of cam 59 relative to the end of lever 60, the latter may be provided with a roller 102.

After the welding operation has been initiated, the line of welding on work 10 is moved past the arcing terminal of electrode 12 by simultaneously rotating and guiding turntable 11 relative thereto. Eventually, cam 59 again engages the lower end of pivoted lever 60 and moves it to the right. The consequent movement of the upper end of the pivoted lever 60 to the left results in the operation of limit switch 62 which closes its contacts 61 against the bias of spring 63. Because of the late starting of the weld and the length of the cam 59 compared to the travel of the pivoted lever 60, limit switch 62 is closed before the weld has closed upon itself.

The reduction of welding current when the weld closes upon itself, the final amount of weld overlap, and the counterclockwise movement of turntable 11 is under the control of adjustable time element relays 48 and 67 associated with limit switch 62. Relay 68 also associated with this limit switch permits it to reopen when cam 59 travels past the end of pivoted lever 60 without influencing the energization and control resulting from time element relays 48 and 67.

The closure of limit switch 62 simultaneously energizes the operating windings of relays 48, 67 and 68. The operating windings 64, 65 and 66 of these relays are connected in parallel with one another across the source of supply 40 through the following circuit: From one terminal of the source of supply through contacts 41 of stop switch 42, conductor 86, switch 71, conductors 103 and 104, contacts 69 of limit switch 70, and conductors 105 and 85 to the other terminal of the source of supply. As pointed out above, the relative rotation of cam 59 and lever 60 at the beginning of the welding operation has permitted limit switch 70 to close its contacts 69 prior to the closing of contacts 61 of limit switch 62 by the operation of the same cam and lever.

Relay 48 is adjusted to open its contacts 47 when the weld closes upon itself. The opening of these contacts deenergizes electromagnetic switch 33 which opens its contacts 31 inserting part of resistance 99 into the welding circuit. The weld is consequently lapped upon itself with reduced welding current until the welding operation is terminated.

The welding operation is terminated and reverse rotation imparted to the turntable 11 by the operation of time element relay 67. The time differential between the opening of contacts 47 of relay 48 and the closing of contacts 76 of relay 67 determines the amount the weld is lapped upon itself.

The closure of contacts 76 of relay 67 connects the operating winding 77 of relay 78 across the source of supply 40 as follows: From one terminal of the source of supply through contacts 41 of stop switch 42, switch 71, conductors 103, 106, 84 and 85 to the other terminal of the source of supply. The consequent operation of relay 78 opens its contacts 79 and closes its contacts 80. The opening of contacts 79 breaks the holding circuit in shunt to the contacts 43 of start switch 44 thereby deenergizing relays 38 and 50. Relay 38 will consequently open its contacts 37 and thus the armature circuit of the electrode feed motor 36 and relay 50 will open its contacts 50b and 50c and close its contacts 50a. The opening of contacts 50b of relay 50 deenergizes electromagnetic switch 32 and the opening of contacts 50c of relay 50 deenergizes relay 21. Electromagnetic switch 32 consequently opens its contacts 30, stopping the flow of welding current and relay 21 opens its contacts 19 and 20 while closing its contacts 26, thus stopping with dynamic braking the forward rotation of travel motor 14 and turntable 11. The opening of the electrode feed motor circuit at contacts 37 of relay 38 prevents feeding of electrode 12 away from the work as would otherwise result upon zero voltage conditions across the electrode and work resulting from the opening of contacts 30 of electromagnetic switch 32.

The closure of contacts 80 of relay 78 and of contacts 50a of relay 50 connects the operating winding 81 of relay 24 across the source of supply 40 from one terminal thereof through conductors 107 and 108 to the other terminal of the source of supply. Relay 24 thus operates to open its contacts 25 disconnecting the dynamic braking circuit of travel motor 14 and closes its contacts 22 and 23 which connect the travel motor to the source of supply 18 for reverse rotation. This reverse rotation continues until the counterclockwise movement of the turntable 11 rotates cam 59 attached thereto part way past lever 60 and swings it to the position shown in the drawing when contacts 69 of limit switch 70 are opened.

The opening of limit switch 70 deenergizes relays 48, 67 and 68. Relay 67, by opening its contacts 76, deenergizes the operating winding 77 of relay 78 and this relay in turn, by opening its contacts 80, deenergizes the operating winding 81 of relay 24. When relay 24 is deenergized, it opens its contacts 22 and 23 disconnecting travel motor 14 from the source of supply 18, and closes its contacts 25 completing a dynamic braking connection of the travel motor which brings it promptly to rest with the cam 59 and lever 60 in the positions illustrated.

The sequence of operation above described results in starting a weld on the work 10 at point s, closing the weld upon itself, and then lapping the weld until the point f is reached, when the welding operation is terminated and the work part and electrode returned to their starting position. The positioning of cam 59 of turntable 11 relative to lever 60 and limit switch 70 controls the starting and stopping positions of turntable 11 and consequently where the weld is initiated on a new work part 10. By giving cam 59 a length such that on reverse rotation it does not travel past lever 60 and on forward rotation it operates lever 60 and limit switch 62 before turntable 11 makes one complete revolution and the weld closes upon itself and by associating with this limit switch adjustable time element relays, I provide a simple adjustment for reducing the welding current when the weld is closed upon itself and for terminating the welding operation after the weld has been lapped on itself a predetermined amount. This greatly simplifies the mechanical features of the limit switch operating mechanism and removes from the machine to a control panel the adjustment thereof which becomes necessary due to backlash and the unpredictable operating characteristics of the various elements of the control system. Furthermore, by using a relay to complete a holding circuit about the contacts of limit switch 62 it is possible to permit not only overtravel of the limit switch operating mechanism resulting from the use of the adjustable time element relays 48 and 67 but to have this overtravel actually result in a reopening of the limit switch without interfering with the desired operation of the control.

It is apparent that many features of my invention are applicable to any control circuit embodying limit switches for starting or stopping desired operations when members traversed relatively to one another reach a predetermined desired relative position. I intend, consequently, to cover by the appended claims all modifications and variations coming within the true spirit and scope of my invention.

What I claim as new and desire to secure by Letters Patent of the United States is:

1. Apparatus comprising means for traversing members relative to one another, means including a limit switch for controlling said traversing means, means responsive to the relative travel of said members for operating said limit switch before said members reach a desired relative position, and means including an adjustable time element relay associated with said limit switch for adjusting the stoppage of said traversing means by operation of said controlling means to obtain said desired relative position of said members.

2. Apparatus comprising means for traversing members relative to one another, means including a limit switch and an adjustable time element relay actuated thereby for initiating an operation when said members are in a predetermined position relative to one another, and means responsive to the relative movement of said members for operating said limit switch prior to the arrival of said members at said predetermined position and while their time of travel to said predetermined position is within the adjustable time range of said relay.

3. Apparatus comprising means for rotating members relative to one another in opposite directions, means including a limit switch for arresting rotation of said rotating means in one direction of travel, means including a second limit switch and an adjustable time delay relay for arresting rotation of said rotating means in the other direction of travel, and means selectively responsive to rotation in opposite directions of said rotating means for operating said first-mentioned limit switch when said members reach a desired relative position in one direction of travel and for operating said second mentioned limit switch before said members reach a second desired relative position in the other direction of travel, said second desired relative position of said members being attained through the adjustment of said time element relay associated with said second mentioned limit switch.

4. Apparatus comprising means for traversing members relative to one another, means including a limit switch for arresting the relative travel of said members, means for operating said limit switch in response to relative travel of said members, and means including an adjustable time element relay associated with said limit switch for adjusting the amount of relative travel of said members by adjusting their travel beyond that necessary to operate said limit switch.

5. Apparatus comprising means for rotating members relative to one another in opposite directions, means including a limit switch for arresting rotation of said rotating means in one direction of travel, means including a second limit switch and an adjustable time delay relay for arresting rotation of said rotating means in the other direction of travel, and means including a cam and pivoted lever rotatable relative to one another in opposite directions with said rotating means for operating one of said limit switches when said members reach a desired relative position in one direction of travel and for operating the other of said limit switches before said members reach a second desired relative position in the opposite direction of travel, said second desired relative position of said members being attained through an adjustment of said time element relay associated with said second-mentioned relay.

6. Apparatus comprising means for rotating one member relatively to another in forward and reverse directions, means including forward and reverse limit switches for controlling the relative rotation of said members, means including a lever and cam for selectively operating said limit switches in response to forward and reverse relative movement of said lever and cam, means for moving said cam and lever relatively to one another in response to forward and reverse rotation of said members, and means including a time element relay associated with one of said limit switches for permitting relative travel of said cam and lever beyond that necessary to operate said one limit switch.

7. Apparatus comprising means for rotating one member relatively to another in forward and reverse directions, means including forward and reverse limit switches for controlling the extent of travel of said members in opposite directions, means including a pivoted lever and fixed cam having a length greater than the travel of the end of said lever engaged thereby for selectively operating said forward and reverse limit switches in response to forward and reverse travel of said traversing means, and means for rendering a positioning of said cam which adjusts the extent of travel of said traversing means in one direction also effective for adjusting its extent of travel in the opposite direction, said means including an adjustable time element relay controlled by one of said limit switches.

8. Apparatus for starting a weld at a predetermined point on a work part and for lapping said weld upon itself a predetermined amount at reduced current comprising an electrode support, a work support adjacent thereto, means for positioning work on said work support in a predetermined position relative thereto and to said electrode support, means for rotating said work support and electrode support relative to one another in forward and reverse directions, means for starting a weld by supplying welding current and voltage to said electrode and work and imparting forward rotation to said rotating means, means including a pivoted lever and cam having a relative rotation corresponding to that of said electrode and work, said cam having a length and travel such that said lever is tilted in opposite directions by a rotation of said cam corresponding to less than one complete revolution of said rotating means, means including a limit switch actuated by said cam and lever in response to a forward rotation of said rotating means less than one complete revolution, means including an adjustable time element relay energized by said limit switch for reducing the flow of welding current to said electrode and work when said weld closes upon itself, means including a second adjustable time element relay energized by said limit switch for terminating said welding operation and reversing said rotating means when said weld has been lapped upon itself a predetermined amount, and means including a second limit switch actuated by said cam and lever in response to reverse rotation of said rotating means for returning said electrode support and work support to their starting position.

9. Arc welding apparatus comprising means for feeding an electrode into and out of engagement with a work part to strike and maintain a welding arc, means including a turntable for supporting a work part in a predetermined position relative to said electrode and for traversing said work part relative to said electrode along a predetermined line of welding, means for supplying welding current and voltage to said electrode and said work part, means for rotating said turntable in opposite directions relative to said electrode, means for starting a weld by imparting forward rotation to said rotating means, connecting said supply means to said electrode and work and starting said electrode feeding means, and means for adjusting the lapping of said weld upon itself with reduced current and then imparting reverse rotation to said rotating means to return said work to its starting position, said means including a cam mounted on said turntable and rotatable therewith relative to a pivoted lever one end of which is in the path of travel of said cam and is movable from one position to another in response to movement in opposite directions of said cam, a limit switch operated by said cam and lever before said weld is closed upon itself, a plurality of time element relays energized by said limit switch through a circuit including a second limit switch which is operated by reverse relative rotation of said cam and pivoted lever, means including one of said time element relays for reducing the flow of welding current to said electrode and work when said weld is closed upon itself, means including said second time element relay for interrupting the flow of welding current, stopping the electrode feeding means, and imparting reverse rotation to said rotating means after said weld has been lapped upon itself a predetermined amount, and means including said second-mentioned limit switch for terminating said reverse rotation when said electrode and work parts have been returned to their starting position.

VERNON E. MANN.